United States Patent [19]
Sakamoto et al.

[11] Patent Number: 5,743,996
[45] Date of Patent: Apr. 28, 1998

[54] STRUCTURE OF BONDING DIE FOR FORMING A SEAT

[75] Inventors: Ikuo Sakamoto; Tatsuo Majima, both of Akishima, Japan

[73] Assignee: TACHI-S Co., Ltd., Tokyo, Japan

[21] Appl. No.: 703,474

[22] Filed: Aug. 27, 1996

[51] Int. Cl.$^6$ ..................................................... B32B 31/00
[52] U.S. Cl. ........................... 156/581; 156/580; 425/412
[58] Field of Search ....................................... 156/228, 245, 156/290, 500, 580, 581, 583.1; 425/406, 412; 264/46.5, 321

[56] References Cited

U.S. PATENT DOCUMENTS

| | | | |
|---|---|---|---|
| 4,979,890 | 12/1990 | Bracesco | 425/399 |
| 5,000,805 | 3/1991 | Lowe | 156/90 |
| 5,076,880 | 12/1991 | Spengler et al. | 156/382 |
| 5,238,513 | 8/1993 | Gill | 156/64 |
| 5,290,093 | 3/1994 | Crayne et al. | 297/452.61 |
| 5,326,417 | 7/1994 | Phelps | 156/267 |
| 5,336,352 | 8/1994 | Tokura | 156/214 |
| 5,372,668 | 12/1994 | Bracesco | 156/214 |
| 5,395,473 | 3/1995 | Nixon | 156/291 |

FOREIGN PATENT DOCUMENTS

| | | |
|---|---|---|
| 1-30507 | 6/1989 | Japan. |
| U 5-63825 | 8/1993 | Japan. |
| U 5-72431 | 10/1993 | Japan. |
| U 6-72496 | 10/1994 | Japan. |
| U 6-86920 | 12/1994 | Japan. |
| U 7-3499 | 1/1995 | Japan. |

*Primary Examiner*—James Sells
*Attorney, Agent, or Firm*—Browdy and Neimark

[57] ABSTRACT

A structure of bonding die for use with a trim cover assembly having a connected portion where one cover section thereof is sewn with another cover section thereof, and for pressure bonding the trim cover assembly to a foam cushion member. A retainer member is provided on the die, which is formed by bending a rigid wire material into a loop-like shape such as to have an inward elastic deformability give therein. Such retainer member permits its smooth insertion into the connected portion of trim cover assembly, without any tear and damage caused in the trim cover assembly per se, to thereby provide an easy and precise location of the trim cover assembly with respect to the foam cushion member.

16 Claims, 3 Drawing Sheets

STRUCTURE OF BONDING DIE FOR FORMING A SEAT

BACKGROUND OF INVENTION

1. Field of the Invention

The present invention relates to a bonding die for use in bonding a trim cover assembly to a foam cushion member to form a vehicle seat or automotive seat, and is in particular directed to a structure of pressure-bonding die of this kind on which the trim cover assembly is secured.

2. Description of Prior Art

As one of means for forming a seat for vehicle or automobile, a bonding die is made available, by which a trim cover assembly is pressed and bonded to the outer surfaces of a foam cushion member. In this bonding operation, it is important to locate and retain the trim cover assembly precisely at a predetermined point relative to the foam cushion member. For that purpose, hitherto, it has been a common practice to use a bonding die having plural locating needles with which the trim cover assembly is impaled and located at a predetermined position relative to the foam cushion member, prior to the trim cover assembly being pressed and bonded to the foam cushion member, as disclosed from the Japanese Granted Patent Pub. No. 1-30507 for instance. However, the impaling of trim cover assembly with those needles leaves plural objectionable apertures in the trim cover assembly. It may not only result in the textile of trim cover assembly being cut and damaged, but also may cut a connecting thread which connects together one and another cover sections of the trim cover assembly. Further, the trim cover assemlby, which is applied a pressure when being bonded to the cushion member, experiences a tension, and this tension may forcibly widen the foregoing apertures so much as to cause a tear therefrom, with the result that the trim cover assembly may be torn and broken from the apertures during the pressure bonding process.

This sort of bonding die, moreover, has a difficulty in securing thereon a trim cover assembly of the type formed by sewing together two separate cover sections (e.g. a central cover section corresponding to a central seating area of seat and a peripheral cover section corresponding to a peripheral region of seat surrounding that central seating region). Such trim cover assembly is uphove toward its reverse side in the connecting area where the two separate cover sections are sewn with each other, and therefore, when reversing and placing this trim cover assembly upon a base die member of the bonding die, as with the common procedure in this art, the uphove connecting area of trim cover assembly is floated from the surface of base die member, which makes it difficult to retain and locate the trim cover assembly at a given position. This may also cause such a problem that the locating needles do not thrust enough into the floated connecting area of trim cover assembly, resulting in dislocation of the trim cover assembly from a given position relative to the cushion member.

SUMMARY OF THE INVENTION

In view of the above-stated drawbacks, it is therefore a primary purpose of the present invention to provide an improved structure of bonding die for use with a trim cover assembly having a connected portion where one cover section thereof is sewn with another cover section thereof, and for pressure bonding of such trim cover assembly to a foam cushion member to form a seat, which permits smooth and precise bonding of the trim cover assembly to the foam cushion member without any tear and damage caused in the trim cover assembly.

In order to achieve such purpose, the structure of bonding die in accordance with the present invention is basically comprised of:

a die member upon which the foregoing trim cover assembly is to be placed for pressure bonding with a foam cushion member, the die member including a retaining area where the abovementioned connected portion of trim cover assembly is to be retained; and a retaining means of a loop-like shape for retaining the trim cover assembly at a predetermined position for the pressure bonding with the foam cushion member, which retaining means is formed by bending a rigid wire material into a loop-like shape and provided on the die member at a point corresponding to the foregoing retaining area, Accordingly, the loop-like retaining means may be inserted smoothly into the connected portion of trim cover assembly, without widening the connected portion and damaging the trim cover assembly during the pressure bonding process.

Preferably, the retaining means may comprise a steel wire formed in such loop-like shape, which is elastically deformable in a direction inwardly thereof.

In one aspect of the present invention, the retaining means comprises a retainer member made of a steel wire having a generally arrow-like shape which is formed by bending the steel wire into the generally arrow-like shape having an inward elastic deformability given therein, and such retainer member is arranged at the retaining area of die member in such a manner that the inward elastic deformability thereof is displayed along a direction in which the connection portion of trim cover assembly extends.

An upstanding location member may be provided at the retaining area of die member, which projects vertically therefrom such as to be capable of insertion into a groove created in the connected portion of trim cover assembly.

The retainer member may be formed to have an arrow-headed portion and a leg portion so that it may be resiliently inserted and anchored in a seam of the connected portion, with the inward elastic deformability thereof being displayed along a direction in which the seam extends within the connected portion. To enhance such action, the arrow-headed portion may have, defined therein, a top portion, a pair of upper slanted portions diverging from the top portion, and a pair of lower slanted portions converging from the respective pair of upper slanted portions.

Other features and advantages of the present invention will become apparent from reading of description hereinafter, with reference to the annexed drawings.

DETAILED DESCRIPTION OF PREFERRED EMBODIMENT OF THE INVENTION

Figure 6:
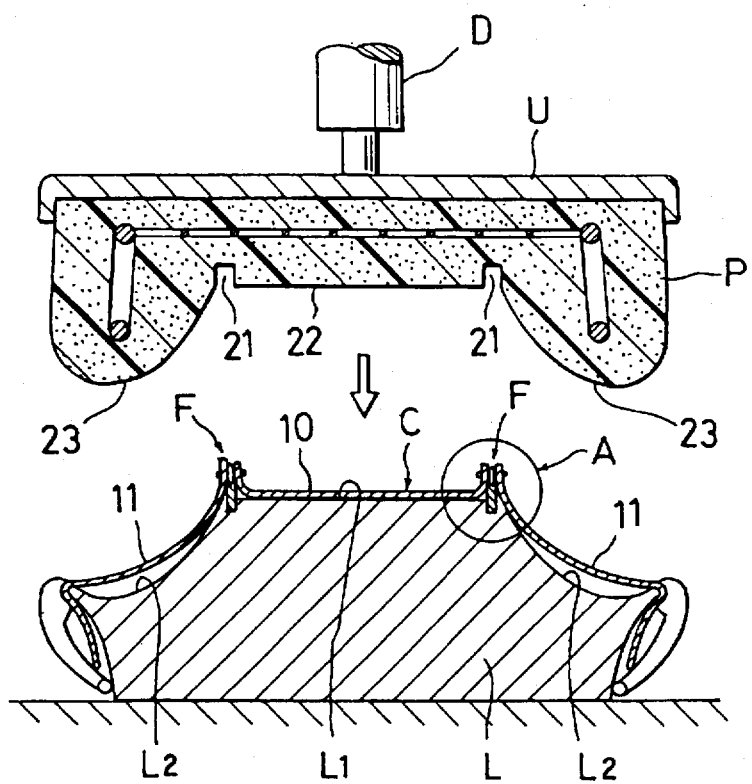
FIG. 6 is a schematic sectional view of the pressure bonding die apparatus in accordance with the present invention, which shows its bonding operation.

In accordance with the present invention, as generally shown in FIG. 6, there is provided a pressure-bonding-type die apparatus comprising a vertically movable upper die member (U) and a stationary base die member (L). The upper die member (U) may be moved by operation of cylinder (D) in a vertical direction towards and away from the base die member (S). As illustrated, a foam cushion member (P) and a trim cover assembly (C), which are to form a seat for vehicle or automobile, are respectively secured on the upper and base die members (U)(L). In particular, the trim cover assembly (C) are turned upside down and secured on the base die member (L), with the reverse side thereof exposing outwardly.

The foam cushion member (P) has an upper surface configured in a shape conforming to a predetermined outer shape of seat, such as to have, defined therein, a central seating area (22) and a pair of spaced-apart bolster side areas (23)(23). Designation (21) denotes a recessed groove formed between the central seating area (22) and bolster side area (23).

Figure 1:
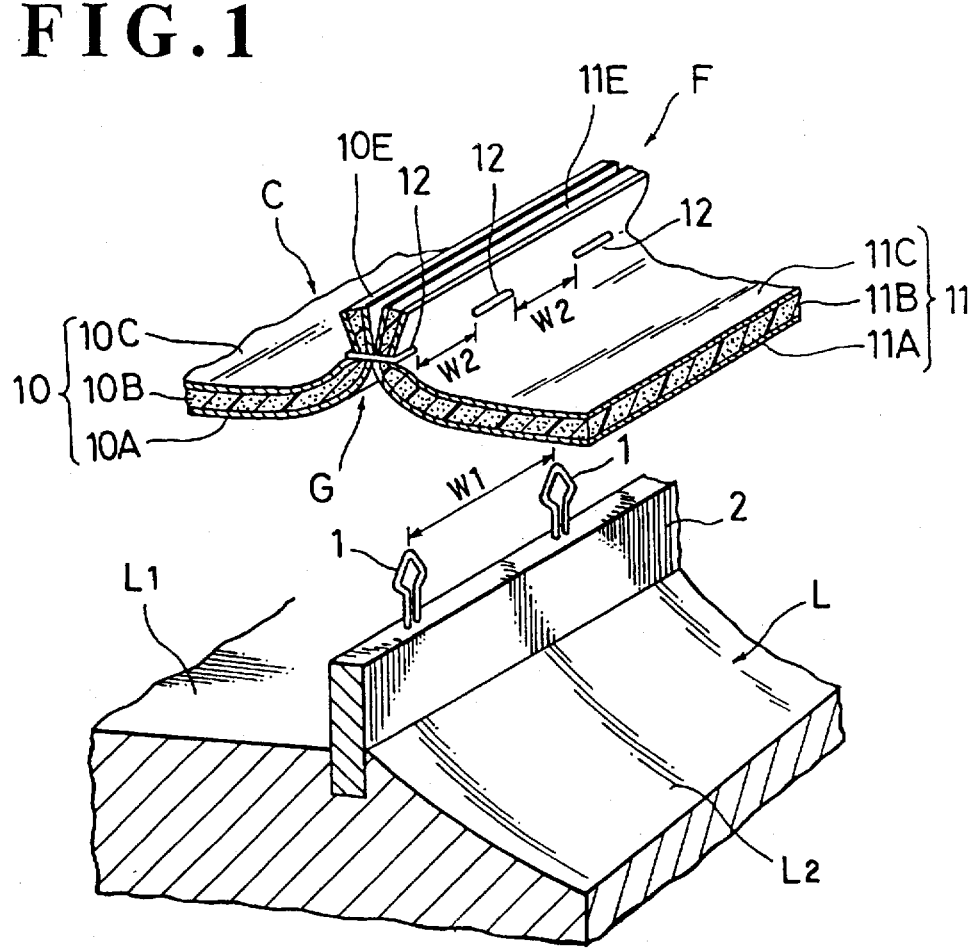
FIG. 1 is a schematic perspective view of a base die member of bonding die apparatus in accordance with the present invention, and a trim cover assembly which is to be secured on the base die member.
Figure 7:
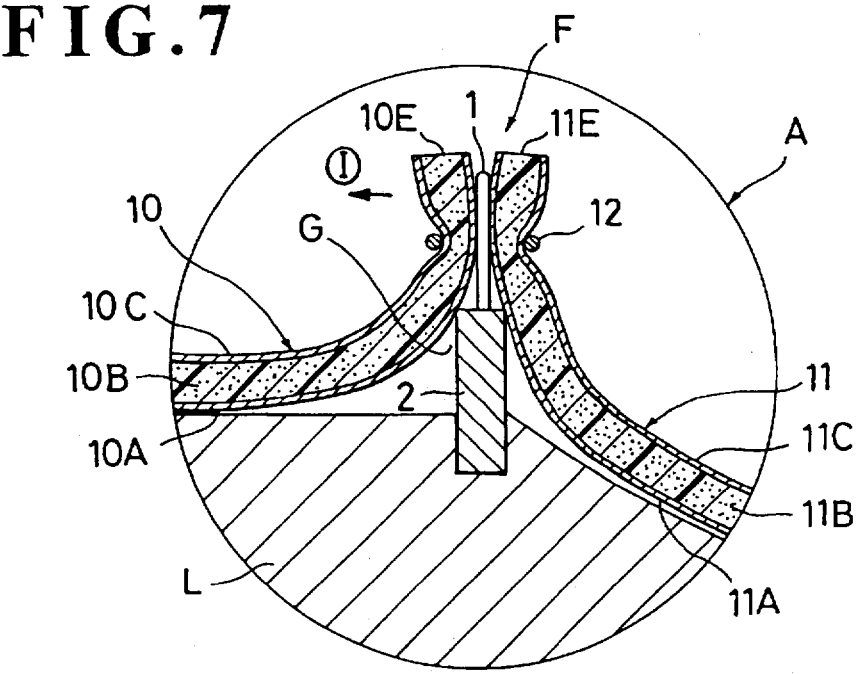
FIG. 7 is an enlarged view corresponding to the encircled part (A) shown in FIG. 6.

The trim cover assembly (C) is formed by sewing together a central cover section (10) and a pair of side cover sections (11)(11). As shown in FIGS. 1 and 7, each of those cover sections (10, 11) is of a three-layer lamination structure: Namely, the central cover section (10) is formed from the lamination of a top cover layer (10A), a foam wadding layer (10B) (a slab urethane foam layer) and a back cloth layer (10C) in this order, whereas each of the two side cover sections (11)(11) is formed likewise from the lamination of a top cover layer (11A), a foam wadding layer (10B) and a back cloth layer (11C) in this order. Those cover sections (10)(11) are sewn and connected together by a thread (12) at and along their respective ends (10E)(11E) such that this connected portion is uphove or projected in a direction toward the reverse side (at 10C, 11C) of trim cover assembly (C), as best shown in FIG. 1. It is seen here that a valley-like groove portion (G) is created at the frontal side (at 10A, 11A) of trim cover assembly opposite to that reverse side. As understandable from FIG. 6, the trim cover assembly (C) on the whole is of such configuration that the central cover section (10) is dimensioned to cover the central seating area (22) of cushion member (P) whereas the two side cover sections (11)(11) are dimensioned to cover the two bolster side portions (23)(23), respectively. As shown in FIG. 6, in the trim cover assembly (C) thus formed, there are produced a pair of spaced-apart uphove connected portions (F)(F), each extending along the juncture between the juxtaposed two ends (10E)(11E) of central and side cover sections (10)(11). Those two uphove connected portions (F)(F) are respectively to be fitted and bonded in the abovementioned two recessed grooves (21)(21) of cushion member (P), under a bonding operation to be explained later.

The base die member (L) is so formed to have a flat central die surface (L1) on which the central cover section (10) is to be placed, and a pair of spaced-apart curved peripheral die surfaces (L2)(L2) on which the two side cover sections (11)(11) are to be placed, respectively, as in FIG. 9. Those die surfaces (L1)(L2) are shaped in conformity with the central and bolster side portions (22)(23) of cushion member (P), so as to insure that the whole outer surfaces of cushion member (P) are brought to a sufficient pressed contact with the reverse surfaces of trim cover assembly (C). In accordance with the present invention, the base die member (L) is provided with a pair of upstanding location members (2)(2) erecting fast thereon for the purpose of temporarily retaining and locating the reversed trim cover assembly (C) relative to the foam cushion member (P) as will be explained later. The upstanding location members (2)(2) are disposed on the base die member (L) such that one of them extends at and along one boundary between the central and peripheral die surfaces (L1)(L2) while another of them extends at and along another boundary between those two die surfaces (L1)(L2) and that the location members (2)(2) are spaced apart from each other in a width generally equal to that between the abovementioned two uphove connected portions (F)(F) of trim cover assembly (C). The upstanding location members (2)(2) are each formed from a metallic plate which generally corresponds in length to the valley-like groove portion (G) of trim cover assembly. Also, each location member (2) has a height generally equal to the depth of valley-like groove portion (G). As partly understandable in FIG. 2, the upstanding location members (2)(2) are formed to include some different top surfaces (2a)(2b) varying in height in conformity with an uneven contour of both trim cover assembly (C) and cushion member (P).

Figure 3:
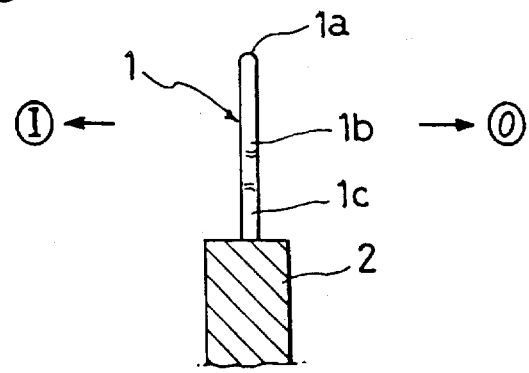
FIG. 3 is a sectional view taken along the line III—III in FIG. 2.
Figure 4:
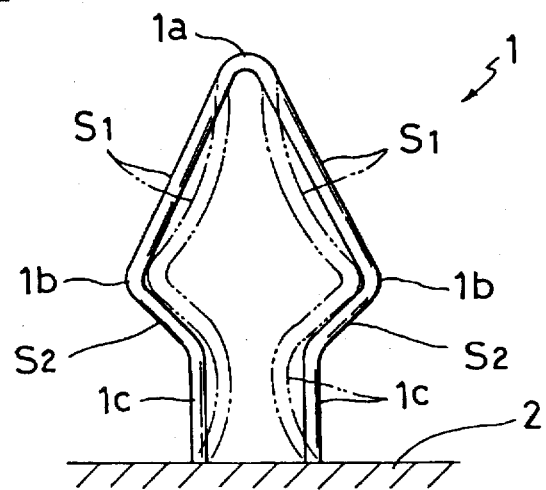
FIG. 4 is a front view of a retainer member fixed on the base die member, showing its inward elastic deformability.
Figure 5:
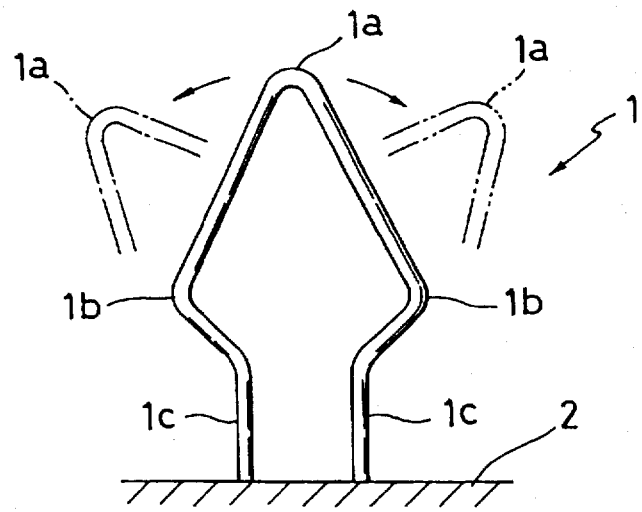
FIG. 5 is a front view of the retainer member, which indicates that the retainer member is elastically deformable in either of both lateral directions thereof.

Further, in accordance with the present invention, a plurality of retainer members (1) are fixed as by welding to each of the two upstanding location members (2)(2) in such a manner that they are rowed equidistantly along the longitudinal direction of upstanding location member (2). Referring to FIGS. 3 to 5, each retainer member (1) is formed by bending and looping a steel wire of circular cross-section into a generally arrow-like contour having a planar arrow-headed anchor portion (1a, S1, 1b, S2). The illustrated retainer member (1) is so formed to have, defined therein, a pointed head portion (1a), a pair of upper slanted side portions (S1)(S1) diverging downwardly from the head portion (1a), a pair of outwardly projected corner portions (1b)(1b), a pair of lower slanted side portions (S2)(S2) each converging downwardly from the respective two corner portions (1b)(1b), and a pair of vertical leg portions (1c)(1c). Again, the head portion (1a), slanted portions (S1)(S2) and corner portions (1b)(1b) in the aggregation assume a generally planar arrow-headed anchor portion which is easy to be thrust and anchored in the connected portion (F) of trim cover assembly (C) as will be described later. The thus-bent steel wire member (1) is resiliently deformable inwardly thereof as indicated in FIGS. 4 and 5, but it has a resistance against deformation in a direction orthogonal to both planar sides thereof, as indicated by the arrows ① and ⓞ in FIG. 3. This rigid and elastic phenomenon is simply based on the fact that an elasticity is only produced from the bent area of steel material, allowing the steel material to be resiliently deformable towards the direction in which it is bent. Hence, the retainer member (1), by the reason that it is not bent towards such direction orthogonal to its both planar sides, maintains a rigidity against deformation in that direction. Experiments show that a steel wire of approx. 1 mm in diameter is found optimal in giving such steel characteristics to the retainer member (1).

Figure 2:
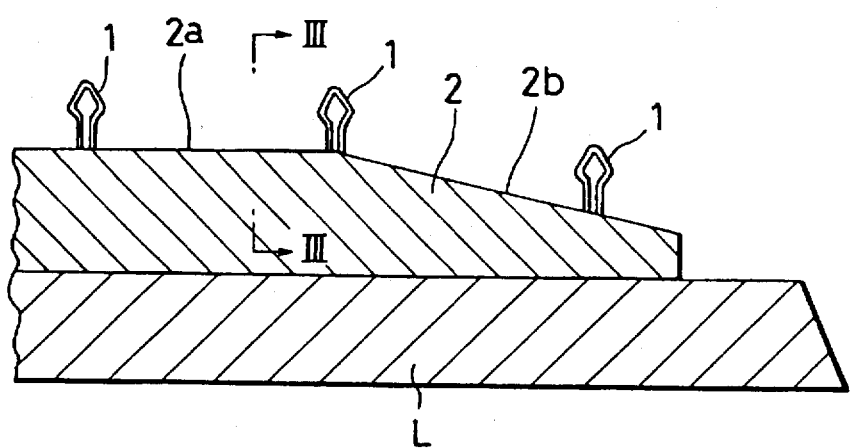
FIG. 2 is a partly broken sectional view of the base die member.

FIG. 2 shows the plural retainer members (1) to be disposed on and along the longitudinal top surface of upstanding retainer member (2), with their respective arrow-headed head portions in parallel therewith. It is seen that all the arrow-headed anchor portions of retainer members (1) maintain their parallel relation with the horizontal and sloped top surfaces (2a)(2b) of upstanding retainer member (2) in order to insure fit and even insertion of all those retainer members (10) into and along the connected portion (F) of trim cover assembly (C) which is uneven vertically due to the uneven configuration of trim cover assembly (C) as mentioned earlier.

As indicated in FIG. 1, the retainer members (1) may be normally disposed on and along the upstanding retainer member (2) at a proper equidistant interval (W1), depending upon the seam intervals (W2) of the thread (12), so that each retainer member (1) may be smoothly thrust into the connected portion (F) and caught in the seam interval of thread (12). But, as will be discussed in detail, in accordance with the present invention, such troublesome care for alignment between the seam and retainer member (1) is not required by virtue of the arrow-like bent configuration of retainer member (1) which is given the above-described elastic deformable property.

In operation, the first step is to secure the foam cushion member (P) to the upper die member (U), with the bonding surfaces of foam cushion member (P) dependent therefrom, as in FIG. 6. Thereafter, as shown in FIG. 1, the trim cover assembly (C) is turned upside down and brought to the base die member (L), while ascertaining that the paired groove portions (G) created in the trim cover assembly frontal side (10A, 11A) are aligned with the paired upstanding location members (2), respectively. Thus, as the trim cover assembly (C) is placed on the base die member (L), all the retainer members (1) are thrust into the groove portion (G) and resiliently secured in the seam intervals of thread (12), as can be seen in FIGS. 6 and 7. Here, with regard to the retainer member (1), it is appreciated that the tapered part (1a, S1) thereof allows the retainer member (1) to smoothly thrust into the seam interval of thread (12), while the two outward corner portions (1b)(1b) thereof cause forcible widening of the seam interval of thread (12) along the direction in which the seam or the connected portion (F) of trim cover assembly (C) extends. Consequently, the two leg portions (1c)(1c) of retainer member (1) are caught in the seam of thread (12), with the two lower slanted sides (S2)(S2) thereof in contact with the bridges of thread (12) defined between the seam. The two lower slanted sides (S2)(S2) of retainer member (1), therefore, serve as a temporary detent against removal of the trim cover assembly (C) from the base die member (L). It is further appreciated that the trim cover assembly (C) can be first retained temporarily by the two upstanding location members (2)(2) at the areas around the groove portions (G)(G) thereof, to thereby provide a preliminary positioning of the trim cover assembly (C) relative to the cushion member (P), and then can be finally retained by the retainer members (1) for positive location of the trim cover assembly (C) at a given bonding position with respect to the cushion member (P). Then, referring to FIGS. 6, after the trim cover assembly (C) is secured in that way upon the base die member (L), an adhesive is applied to one or both of the trim cover assembly (C) and cushion member (P), and the cushion member (P) is lowered and pressed by operation of the cylinder (D) to the reverse surface of the trim cover assembly (C) secured on the base die member (L), with the two uphove connected portions (F)(F) of trim cover assembly (C) being fixed in the respective grooves (21)(21). At the completion of this pressure bonding operation, the bonded unit of trim cover assembly (C) and cushion member (P) can be smoothly removed from the base die member (L) because the slanted state of two side portions (S2)(S2) of retainer member (1) facilitates the ease with which the seam of thread (12) slides therealong and passes through the arrow-headed anchor portion of retainer member (1), in cooperation with resilient inward deformation of retainer member (1) per se as understandable from FIG. 4.

Additionally, the retainer member (1) is flexible or adaptable for smooth thrust into any slightly varied seam intervals (i.e. W2 in FIG. 1) of thread (12) in the trim cover assembly (C). In other words, if the seam intervals (W2) of thread (12) are relatively small, each retainer member (1), when inserted into the respective small seam intervals, will be resiliently deformed inwardly into a slender form as indicated by the two-dot chain line in FIG. 4, so that the whole arrow-headed anchor portion (1a, S1, 1b, S2) of retainer member (1) may be smoothly thrust through the small seam interval, and then anchored in the seam at the lower slant side portions (S2)(S2) thereof due to its elastic recovery into the original shape indicated by solid line in FIG. 4. Also, if the seam intervals (W2) of thread (12) are irregularly dislocated relative to the intervals (W1) of looped retainer member (1), the head (1a) of retainer member (1), when diectly collides with the bridge of thread (12) defining each seam interval (W2), will be resiliently displaced in either of two lateral directions indicated by the two arrows in FIG. 5, which corresponds to the longitudinal direction of seam of thread (12), thereby managing to thrust into either of two adjoining seam intervals (W2) for anchoring therein. This is basically due to the fact that lower bent portions of retainer member (1) (i.e. at the bent portion between the lower slanted and leg portions (S2)(1c)) are resiliently deformed inwardly of the retainer member (1) as can be seem from FIGS. 4 and 5.

Furthermore, those retainer members (1) are each of a rectilinear verticality as viewed from its side elevation, which is seen from FIGS. 3 and 7, and rowed along the longitudinal direction of upstanding retainer member (2). Also, each retainer member (1) has rounded corner and slanted side portions (1a, 1b)(S1, S2) in the whole body thereof, including its circular cross-section of wire, hence having no sharp points therein. This configuration not only permits smooth insertion of all the retainer members (1) in and along the connection portion (F) of trim cover assembly (C), without any tear and damage caused in the trim cover assembly (C), but also prevents objectionable widening of such connecting portions (F) in the orthogonal direction thereto (as indicated by the arrows Ⓘ and Ⓞ in FIGS. 3 and 7), which is caused from the stretching of trim cover assembly (C) during the pressure bonding operation as found in the prior art.

Accordingly, in accordance with the bonding die structure of the present invention, the trim cover assembly (C) can be easily retained and located at a predetermined position relative to the foam cushion member (P), without care for damages and removal of trim cover assembly during a pressure bonding operation.

It should be understood that the present invention is not limited to the illustrated embodiments, but any other modifications, replacements and additions may be structurally applied thereto, without departing from the scopes of the appended claims. For example, the retainer member (1) may be formed in a simply tapered shape or a semi-circular shape at the arrow-headed anchor portion (1a, S1, 1b) thereof.

What is claimed is:

1. A structure of bonding die for pressing and bonding a trim cover assembly to a foam cushion member to form a seat, in which the trim cover assembly includes a connected portion where one cover section thereof is sewn with another cover section thereof, said structure comprising:

a die member upon which said trim cover assembly is to be placed for pressure bonding with said foam cushion member, said die member including a retaining area where said connected portion of said trim cover assembly is to be retained; and a retaining means of a loop-like shape for retaining said trim cover assembly at a predetermined position for the pressure bonding with said foam cushion member, said retaining means being formed by bending a rigid wire material into the loop-like shape and provided on said die member at a point corresponding to said retaining area, wherein said retaining means allows insertion thereof into and along said connected portion of said trim cover assembly when the trim cover assembly is placed on said die member.

2. The structure as defined in claim 1, wherein said retaining means comprises a steel wire bent and formed in said loop-like shape, which is elastically deformable in a direction inwardly thereof.

3. The structure according to claim 2, wherein said steel wire is of a circular cross-section having approximately 1-mm diameter.

4. The structure as defined in claim 1, wherein said retaining means comprises a plurality of retainer members which are each formed by bending a steel wire into said loop-like shape to have an inward elastic deformability given therein, and wherein said plurality of retainer members are arranged at said retaining area of said die member in such a manner the inward elastic deformability thereof is displayed along a direction in which said connected portion of said trim cover assembly extends.

5. The structure as defined in claim 1, wherein said retaining means comprises a retainer member made of a steel wire having a generally arrow-like shape which is formed by bending said steel wire into the generally arrow-like shape having an inward elastic deformability given therein, and wherein said retainer member is arranged at said retaining area of said die member in such a manner that the inward elastic deformability thereof is displayed along a direction in which said connection portion of said trim cover assembly extends.

6. The structure according to claim 5, wherein said steel wire is of a circular cross-section having approximately 1-mm diameter.

7. The structure as defined in claim 1, wherein there is further provided a location means at said retaining area of said die member, said location means being for temporarily retaining and locating said trim cover assembly for said pressure bonding with said cushion member, and wherein said retaining means is disposed on said location means.

8. The structure according to claim 7, wherein said location means comprises an upstanding location member which projects vertically from said retaining area such as to be capable of insertion into a groove created in said connected portion of said trim cover assembly.

9. The structure according to claim 5, wherein said retainer member includes an arrow-headed portion and a leg portion so that the retainer member may be resiliently inserted and anchored in a seam of said connected portion, with the inward elastic deformability thereof being displayed along a direction in which said seam extends within said connected portion.

10. The structure according to claim 9, wherein said arrow-headed portion has, defined therein, a top portion, a pair of upper slanted portions diverging from said top portion, and a pair of lower slanted portions converging from the respective said pair of upper slanted portions.

11. The structure as defined in claim 1, which further comprises a location means disposed at said retaining area of said die member, said location means being for temporarily retaining and locating said trim cover assembly for the pressure bonding with said cushion member, wherein said location means extends along a direction in which said connected portion extends, and wherein said retaining means comprises a plurality of retainer members each being made of a steel wire formed in said loop-like shape having an inward elastic deformability given therein, and wherein said said plurality of retainer members are disposed on and along said location means in such a manner as to be elastically deformable along a direction in which said connected portion of said trim cover assembly extends.

12. The structure according to claim 11, wherein said steel wire is of a circular cross-section having approximately 1-mm diameter.

13. The structure according to claim 11, wherein said plurality of retainer members are each formed by bending the steel wire into a generally arrow-like shape having an arrow-headed portion and a leg portion such as to be resiliently inserted and anchored in a seam of said connected portion, and wherein said plurality of retainer members are so disposed on and along said location means that said arrow-headed portion each of said plurality of retainer members is maintained in a parallel relation with a top surface of said location means.

14. The structure according to claim 13, wherein said arrow-headed portion has, defined therein, a top portion, a pair of upper slanted portions diverging from said top portion, and a pair of lower slanted portions converging from the respective said pair of upper slanted portions.

15. The structure according to claim 13, wherein said said arrow-headed portion has, defined therein, a top portion, a pair of upper slanted portions diverging from said top portion, and a pair of lower slanted portions converging from the respective said pair of upper slanted portions, and wherein said leg portion comprises a pair of leg portions each extending continuously from the respective said pair of lower slanted portions.

16. The structure according to claim 13, wherein said steel wire is of a circular cross-section having approximately 1-mm diameter.

* * * * *